US008850174B1

(12) United States Patent
Mahmoud et al.

(10) Patent No.: US 8,850,174 B1
(45) Date of Patent: *Sep. 30, 2014

(54) METHOD FOR DEDICATED NETBOOT

(75) Inventors: Fadi A. Mahmoud, Livermore, CA (US); Victor Raj, Fremont, CA (US)

(73) Assignee: PMC-Sierra US, Inc., Sunnyvale, CA (US)

( * ) Notice: Subject to any disclaimer, the term of this patent is extended or adjusted under 35 U.S.C. 154(b) by 3115 days.

This patent is subject to a terminal disclaimer.

(21) Appl. No.: 10/850,161

(22) Filed: May 19, 2004

Related U.S. Application Data

(60) Provisional application No. 60/484,865, filed on Jul. 2, 2003.

(51) Int. Cl.
*G06F 9/00* (2006.01)

(52) U.S. Cl.
USPC ............... 713/2; 713/100; 709/217; 709/220; 709/222; 717/174; 717/176; 717/177; 717/178

(58) Field of Classification Search
USPC .......... 709/203, 217, 219, 220, 222; 713/1, 2, 713/100; 715/740; 717/171–174, 176–178; 370/254, 255
See application file for complete search history.

(56) References Cited

U.S. PATENT DOCUMENTS

| 5,280,627 | A | * | 1/1994 | Flaherty et al. | 713/2 |
| 5,452,454 | A | * | 9/1995 | Basu | 713/2 |
| 5,577,210 | A | * | 11/1996 | Abdous et al. | 709/219 |
| 5,854,905 | A | * | 12/1998 | Garney | 710/104 |
| 5,974,547 | A | * | 10/1999 | Klimenko | 713/2 |

(Continued)

OTHER PUBLICATIONS

Frozen Technology, "Boot Loader Review: Six Boot Loaders Compared", 2003, <http://www.frozentechnology.com/2003/10/16/boot-loader-review-six-boot-loaders-compared/>.*

(Continued)

*Primary Examiner* — Emmanuel L Moise
*Assistant Examiner* — Sarah Drabik
(74) *Attorney, Agent, or Firm* — Martine Penilla Group, LLP

(57) ABSTRACT

In one embodiment, a method to boot up a server using a target storage device over a network is provided. In this embodiment, the method includes installing an operating system onto a server by storing the operating system in the target storage device located on the network. The location of the target device is designated by an internet protocol (IP) address. The method also includes using data block transfers in conjunction with the IP address to access the operating system on the target storage device.

11 Claims, 8 Drawing Sheets

(56) References Cited

U.S. PATENT DOCUMENTS

| | | | |
|---|---|---|---|
| 5,978,912 A * | 11/1999 | Rakavy et al. | 713/2 |
| 6,202,091 B1 * | 3/2001 | Godse | 709/222 |
| 6,317,826 B1 * | 11/2001 | McCall et al. | 713/1 |
| 6,463,530 B1 * | 10/2002 | Sposato | 713/2 |
| 6,684,327 B1 * | 1/2004 | Anand et al. | 713/2 |
| 6,775,830 B1 * | 8/2004 | Matsunami et al. | 717/176 |
| 6,857,069 B1 * | 2/2005 | Rissmeyer et al. | 713/2 |
| 6,963,981 B1 * | 11/2005 | Bailey et al. | 726/22 |
| 6,971,003 B1 * | 11/2005 | Mahmoud | 713/2 |
| 7,085,921 B2 * | 8/2006 | Frye, Jr. | 713/1 |
| 7,139,816 B2 * | 11/2006 | Anand et al. | 709/220 |
| 7,234,053 B1 * | 6/2007 | Mahmoud | 713/2 |
| 7,243,224 B2 * | 7/2007 | Nair et al. | 713/2 |
| 7,318,148 B2 * | 1/2008 | Scheibli | 713/1 |
| 7,360,072 B1 * | 4/2008 | Soltis et al. | 713/2 |
| 8,438,564 B2 * | 5/2013 | Zhou et al. | 718/1 |
| 2003/0097553 A1 * | 5/2003 | Frye, Jr. | 713/2 |
| 2003/0120827 A1 * | 6/2003 | Fulginiti et al. | 709/319 |
| 2004/0153640 A1 * | 8/2004 | Sugita et al. | 713/2 |
| 2005/0138346 A1 * | 6/2005 | Cauthron | 713/2 |
| 2007/0005816 A1 * | 1/2007 | Diamant et al. | 710/2 |

OTHER PUBLICATIONS

Smart Computing, "Windows 2000 Installation and Setup", Jun. 2004, <http://www.smartcomputing.com/editorial/article.asp?article=articles/archive/r0803/16r03/16r03.asp>, pp. 1-3.*

Best Price Computers, "Software Help", Feb. 2000, <http://web.archive.org/web/20000208134635/http://www.bestpricecomputers.ltd.uk/freehelp/software.htm>.*

Microsoft TechNet, "Remote Operating System Installation", Sep. 9, 1999, <http://technet.microsoft.com/en-us/library/bb742501.aspx>.*

Veselosky, Vince, "Choosing a Boot Loader", 1999, <http://www.control-escape.com/bootload.html>.*

Sarup, Mayank, "LILO configuration and usage", Nov. 2000, retrieved from <http://www.freeos.com/articles/2701/>.*

* cited by examiner

METHOD FOR DEDICATED NETBOOT

CROSS REFERENCE TO RELATED APPLICATIONS

This is a non-provisional application claiming priority from a U.S. Provisional Application No. 60/484,865 entitled "Methods for Dedicated Netboot", filed on Jul. 2, 2003. This application is also related to U.S. patent application Ser. No. 10/712,710, filed on Nov. 12, 2003, entitled "Methods for Expansive Netboot." The disclosures of the aforementioned patent applications are incorporated herein by reference.

BACKGROUND OF THE INVENTION

1. Field of the Invention

This invention relates generally to the field of computing technology and more particularly concerns optimization of server resources and data storage by enabling server access to operating system data from storage devices over a network using internet protocol and block data transfer.

2. Description of the Related Art

The art of networking computers has evolved over the years to bring computer users a rich communication and data sharing experience. Typically, in a network, numerous devices may be connected to a computer or a server to maximize computing power and efficiency. As is well known, new levels of sophisticated communication technologies enable users to share information across both large and small networks. In computer technology, computers may intercommunicate through data transmission using a network connecting numerous computers. For example, in a typical network system, a computer system may include a server connected to peripheral devices such as, for example, storage devices which are interconnected by data buses over a network.

To access and control certain types of peripheral devices connected to a network system, the server generally utilizes host adapter cards (or controllers) attached to the server's backplane. These controllers serve to coordinate and manage the data communication to and from the peripheral devices through the network. Controllers may be in the form of a video display adapter, an integrated drive electronics (IDE) controller, a small computer system interface (SCSI) controller, or other similar cards or chips which control peripheral devices. Such controllers may communicate with the peripheral devices through use of a bus connecting the server with the peripheral devices over a network.

FIG. 1A shows a typical computer network system 10, in accordance with the prior art. In this example, the system 10 includes servers 14, 16, and 18 connected with a network 12. In a typical network, the network 12 is an Ethernet network which utilizes a file based data transfer protocol. The servers 14, 16, and 18 include network interface cards (NIC) 32, 34, and 36 which are connected with NICs 26, 28, and 30 of the network 12. The network 12 is also connected with a hub 16 which itself is connected with terminals 20, 22, and 24. In one example, when multiple servers such as the servers 14, 16, and 18 are operating on the network 12, all of the servers 14, 16, and 18 boot and utilize an operating system. Consequently, all of the servers 14, 16, and 18 must be able to run boot up operations of some kind of operating system such as, for example, Windows 2000. Therefore, the servers 14, 16, and 18 may, in one example, have storage devices such as disk drives that may store the operating system for use by a particular server. In a redundant array of inexpensive disks (RAID) configuration, the operating system for each of the servers 14, 16, 18 would need at least two storage devices included within the server in this type of implementation. Therefore, as more servers are connected with the network 12, more resources are required to run an operating system on all of the servers. For example, if 60 servers were connected to the network 12, then at least 120 disk drives may be necessary if RAID is run on all of the servers. Therefore, extensive amounts of resources might be used that may be extremely costly for a user.

FIG. 1B shows an example of a network system 40 which utilizes a preboot execution environment (PXE) configured as an Ethernet based system allowing servers to boot from storage devices on a network, in accordance with the prior art. Because PXE is utilized, the data transfer protocol utilized is a filed based transfer. Therefore, files needed for boot up operations may be transferred from a storage device to the server being utilized for boot up. The system 40, in this example, includes servers 14, 16, and 18 connected to the network 12 which in turn is connected through NIC 24 to bootable drives 38. In such as example, each of the servers 14, 16, and 18 typically boots up using operating system data received from the bootable drives 38. Unfortunately, the system 40 can only utilize file based data transfer and does not have the flexibility to utilize other data transfer protocols. Therefore, if data storage systems which do not use file based data transfer (e.g., internet SCSI (iSCSI)) are utilized, there is no defined protocol to enable boot up of those servers using data stored on storage devices on the network.

In view of the foregoing, a method is needed for optimizing data transmission such that servers can more efficiently boot from remote storage devices. The method should ensure proper initialization of the servers and allow for improved data storage efficiency.

SUMMARY OF THE INVENTION

Broadly speaking, the present invention fills these needs by providing computer implemented methods for optimizing server resources and data storage by enabling server access to operating system data from storage devices over a network using internet protocol and block data transfer.

It should be appreciated that the present invention can be implemented in numerous ways, including as a process, an apparatus, a system, a device, a method, or a computer readable medium. Several inventive embodiments of the present invention are described below.

In one embodiment, a method for booting up a server using a target storage device over a network is disclosed. The method includes installing an operating system by storing the operating system in the target storage device located within the network. The location of the target storage device is designated by an IP address. The method further includes accessing the operating system on the target storage device using the IP address. The accessing of the operating system is performed from the server using block data transfers.

In another embodiment, a method for installing an operating system on a remote subsystem is disclosed. The method includes initiating a setup operation to install the operating system. The method also includes receiving an IP address of a subsystem where the operating system is to be stored. A number of storage devices located in the subsystem is then determined. The method continues with receiving identification of a target storage device selected from the number of storage devices located in the subsystem. The method further includes installing the operating system in the target storage device using block data transfer.

In yet another embodiment, a method for booting up a server over a network using a remote storage device is disclosed. The method includes retrieving an operating system boot loader from a first sector of the remote storage device. A location of the remote storage device is designated by an IP address stored during an operating system installation process. The method also includes booting up the server using an operating system located on the remote storage device. The booting up is directed by the operating system boot loader obtained from the first sector of the remote storage device.

The advantages of the present invention are numerous. Specifically, by having a dedicated netboot, servers do not have to have their own operating systems stored on each of their storage devices. Instead, servers can access storage devices over the network using internet protocol (IP) with block based data transfer and boot up using operating system data on the storage device. Therefore, systems which use block based data transfer such as, for example, internet SCSI can be utilized. Consequently data storage can be optimized by allowing the operating system(s) to be loaded onto the servers from a limited number of storage devices. As a result, data storage resources can be managed in an optimized manner so unnecessary costs associated with having an excess number of boot storage devices is avoided.

In this fashion a boot drive may be centralized for easy network management and serve to boot multiple iSCSI clients. Moreover, one drive may boot any configuration of iSCSI clients, thus enabling usage of a wide variety of iSCSI clients. Because only one drive may be utilized for boot up, a high return on investment can be achieved for IT management. The present invention is flexible in that it can be run in non-identically configured systems, and can also fit server farms and blade servers where system configurations are identical.

Other aspects and advantages of the invention will become more apparent from the following detailed description, taken in conjunction with the accompanying drawings, illustrating by way of example the present invention.

BRIEF DESCRIPTION OF THE DRAWINGS

The invention, together with further advantages thereof, may best be understood by reference to the following description taken in conjunction with the accompanying drawings in which.

DETAILED DESCRIPTION

An invention is described for a method of accessing an operating system on a remote storage device and booting up from the remote storage device using a block based data transfer protocol over a network, such that an optimized amount of data may be transmitted in a computer system. In this methodology, dedicated netboot is utilized so a server can boot up and access an operating system from a boot up storage device located on a network using interne protocol with block based data transfer.

It should be appreciated that the present invention can be implemented in numerous ways, including as a process, an apparatus, a system, a device, or a method. Several exemplary embodiments of the invention will now be described in detail with reference to the accompanying drawings.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1A:
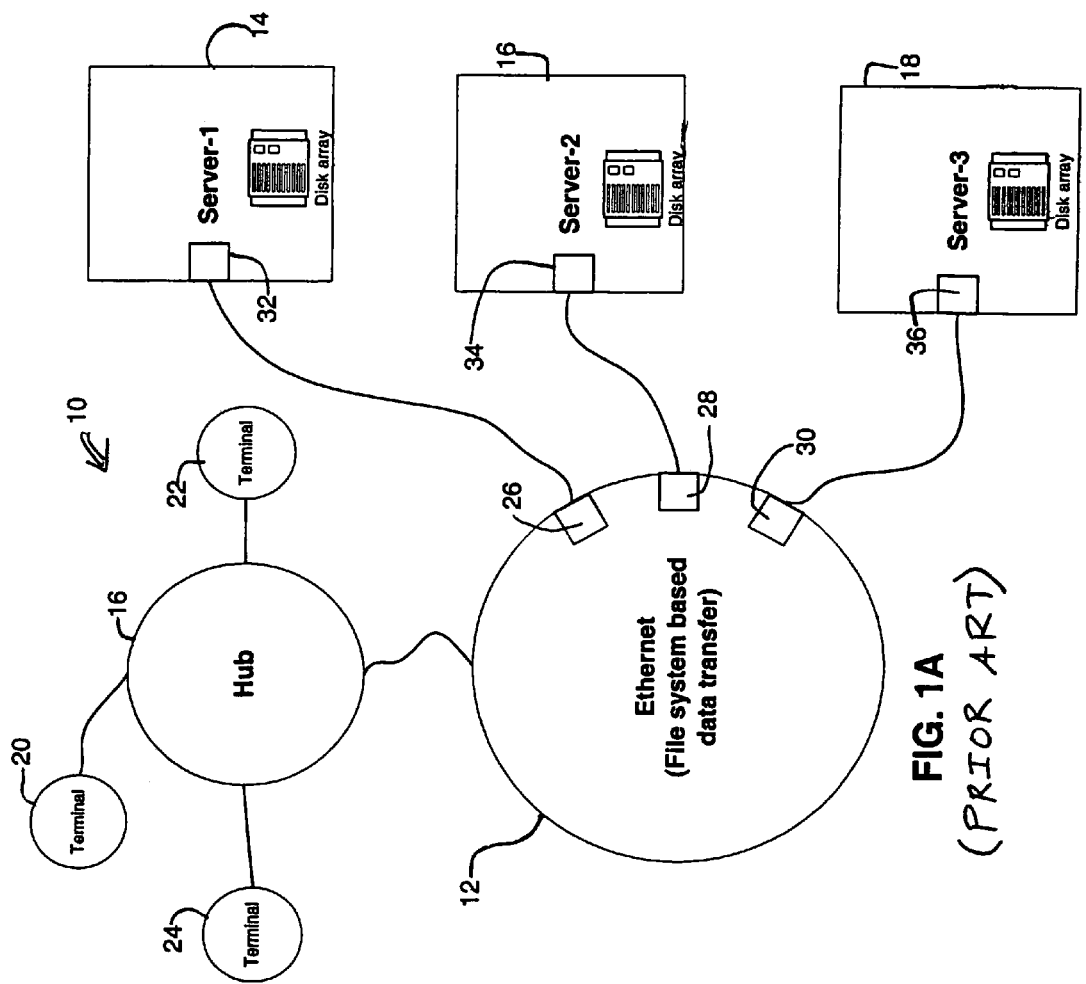
FIG. 1A shows a typical computer network system, in accordance with the prior art.
Figure 1B:
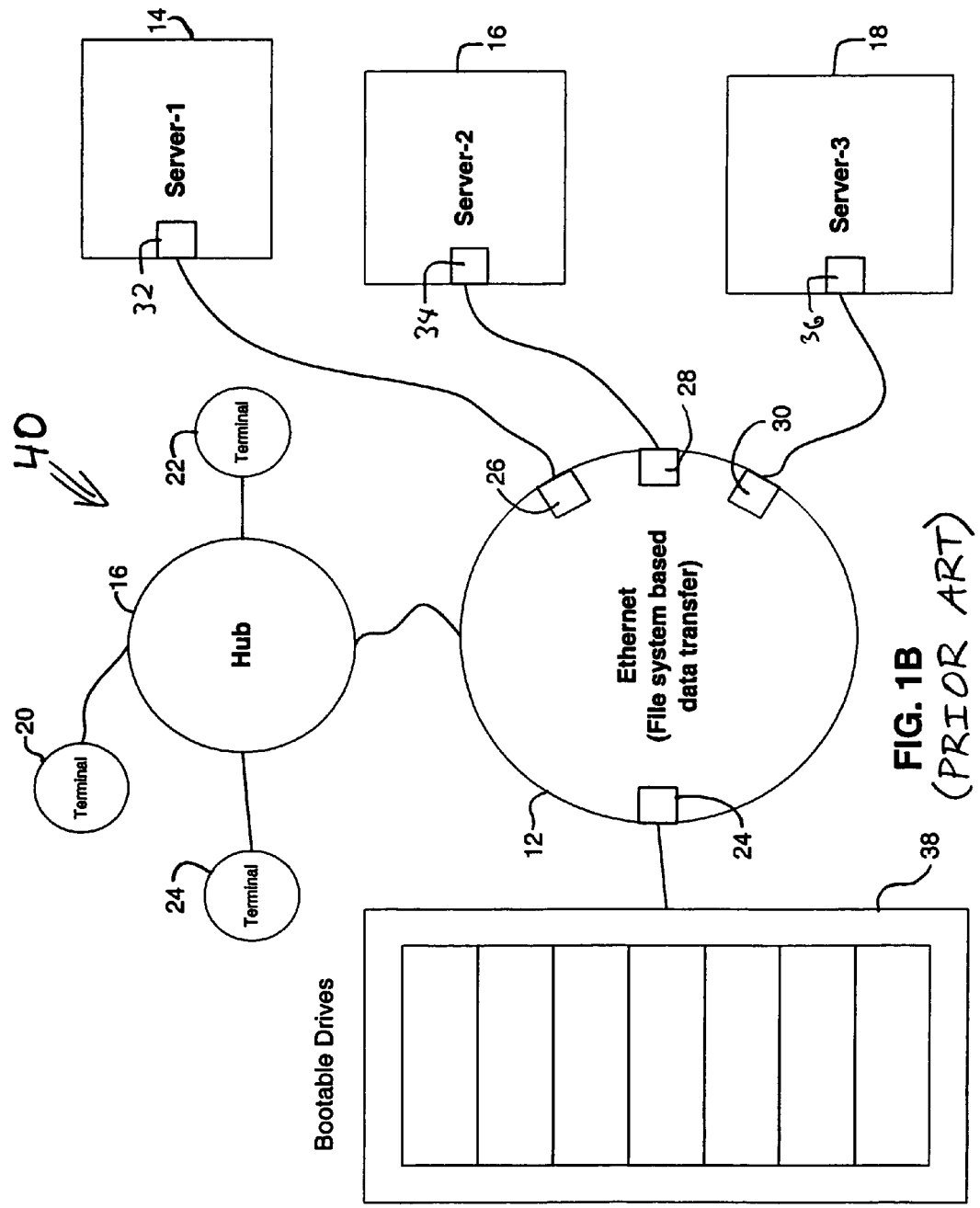
FIG. 1B shows an example of a network system which utilizes a preboot execution environment (PXE) configured as an Ethernet based system allowing servers to boot from storage devices on a network, in accordance with the prior art.
Figure 2:
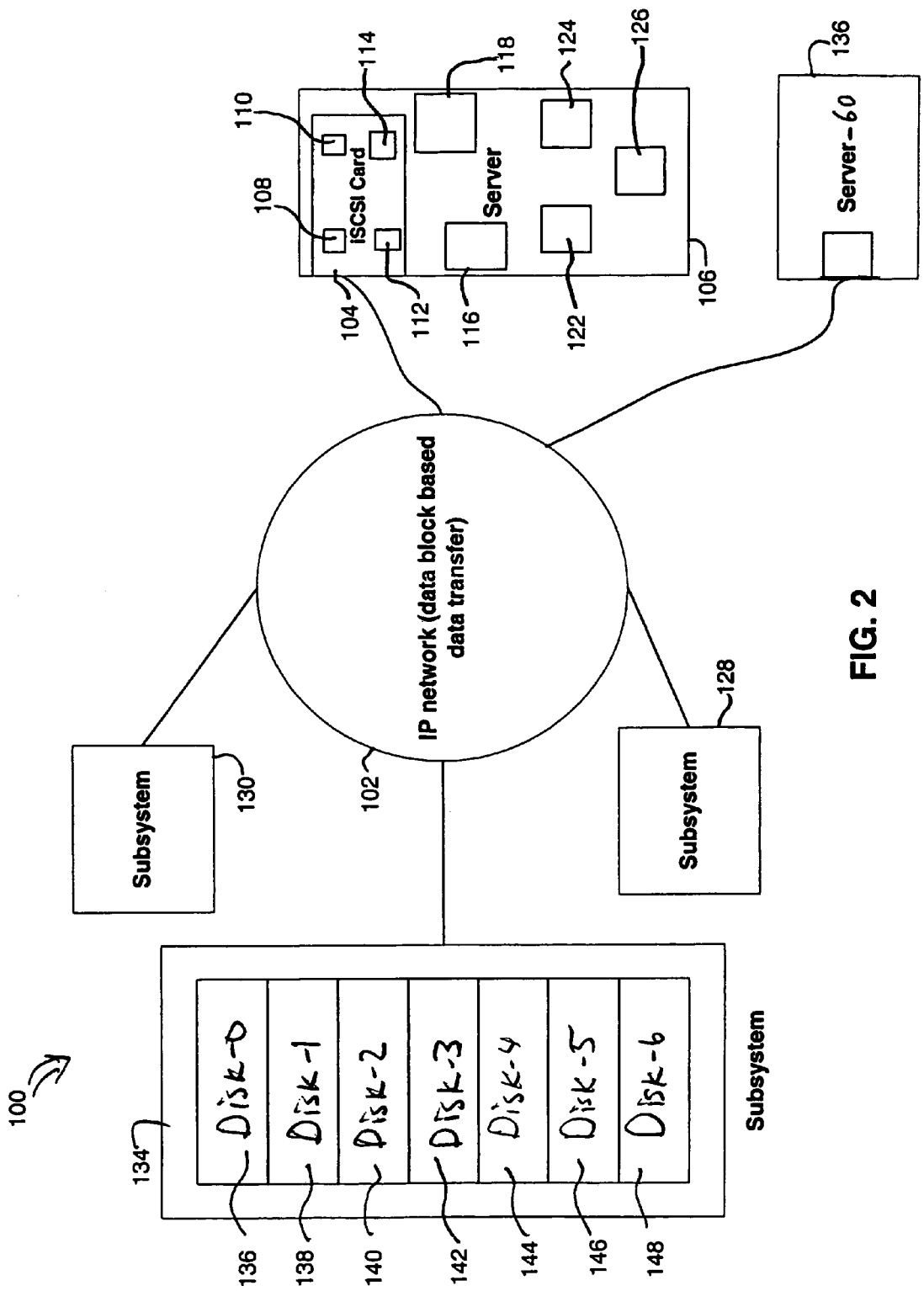
FIG. 2 shows a computer system where dedicated netboot is implemented, in accordance with one embodiment of the present invention.

FIG. 2 shows a computer system 100 where dedicated netboot is implemented, in accordance with one embodiment of the present invention. In this embodiment, the system 100 includes a server 106 connected with a network 102. The network 102 can be any suitable type of network such as, for example, a storage area network, a wide area network, a local area network, etc. The server 106 can be any suitable type of server in any suitable configuration (e.g., a blade server) that in one embodiment may be located in a rack. In addition, there can be any suitable number of servers connected within the network. In one embodiment, there are 60 servers connected within the network 102 ending with Server-60 136. The network 102 is connected with storage subsystems 128, 130, and 134. In one embodiment, an iSCSI card 104 is connected to the server 106 through a PCI connection. It should be appreciated that the system 100 can have any suitable number of storage subsystems and any suitable number of servers depending on the system 100 configuration. The iSCSI card 104 can also be represented in other suitable forms, such as a chip or circuitry on a motherboard, as long as the functionality of the iSCSI card 104 is retained. It should also be understood that although the functionality of the present invention is described in terms of an iSCSI configuration, the methodology described herein can also be utilized to optimize the functionality of storage protocols for any suitable type of storage system using any suitable protocol.

The server 106 includes a CD ROM drive 116, a BIOS boot select (BBS) 118, a memory 124, a microprocessor 126, a system BIOS 122, and the iSCSI card 104. The iSCSI card 104 enables connection of the server 106 to the network 102. The CD ROM drive 116 can be utilized for an installation process when an operating system installation disk is a CD ROM. The BBS 118 stores the types of storage devices where the BIOS looks to boot from and also the order in which the BIOS looks to the devices for boot up data. In one embodiment, the boot order may be set so that boot up is first attempted from a storage subsystem over the network 102.

The iSCSI card 104 includes a TCP offload engine (TOE) 108, an option ROM BIOS 112, an iSCSI input output processor (IOP) 110, and a memory 114. The TOE 108 is an interface device that enables the iSCSI card 104 to communicate with other devices on the network 102. The option ROM BIOS 112 can contain the configuration information for use by the iSCSI IOP 110 for intelligently managing output to and input from devices connected to the iSCSI card 104.

Each of the subsystems 128, 130, and 134 can each include a plurality of storage devices. In one embodiment, the subsystem 134 includes disk drives 136, 138, 140, 142, 144, 146, and 148 (also referred to as Disk-0 through Disk-6, respectively). It should be appreciated that although disk drives are utilized in this embodiment, other types of storage devices such as, for example, CD-RWs, CD-Rs, floppy disk drives, memory sticks, flash memory, etc. . . . , can be included and used within the subsystems 128, 130, and 134. In addition, the subsystem 134 can contain any suitable number of storage devices. In such an implementation, an operating system with accompanying data may be stored on one or more of the disk drives within any of the subsystems 128, 130, and 134. As described below, one or more of the disk drives 136, 138, 140, 142, 144, 146, and 148 can contain operating system data to enable boot up by the server 106 (or any other server) connected to the network 102. In one embodiment, a boot up operation can include a discovery phase, an installation phase (if an operating system is not available as shown by the discovery phase), and the boot phase where the server 106 boots up over the network using the operating system that has been installed on a target storage device.

Consider that upon a first attempt by the server 106 to boot up using the methods described herein, there is no operating system installed on any of the subsystems 128, 130, and 134. In this situation, an installation process is conducted so the when boot up occurs after installation of the operating system, the server 106 will know which disk within the subsystems 128, 130, and 134, contains the operating system data for boot up. Thus, the server 106 will be able to boot up over the network 102 using data from the appropriate disk.

In an initial boot up process before installation has occurred, the system BIOS 122 communicates with the iSCSI card 104 to determine the configuration of storage devices connected to the server. In this embodiment, the iSCSI IOP 110 runs an iSCSI protocol which utilizes block based data transfer using internet protocol packets. Therefore, the iSCSI IOP 110 utilizes a kernel to determine the storage devices available to the server 106. In one embodiment, the operation of determining what devices are available is called a discovery phase. The kernel represents code that is stored in the option ROM BIOS 112 and is retrieved into the memory 114 to be utilized by the iSCSI IOP 110. If setup is not requested by the user, the kernel returns data stating that very large numbers of disk drives are connected to the network but does not know or detect which drives have an operating system.

Before the kernel returns the data, a user can input a keystroke to indicate that setup mode is desired. In one embodiment, the user inputs a keystroke such as, for example, control-A to put the server into setup mode. Once in setup mode, the user can input an IP address of the subsystem where the operating system is to be installed and where the server 106 is to boot from. This IP address can be stored in any suitable non-volatile memory for use by the system BIOS 122 when the server 106 is rebooted. For exemplary purposes an IP address of 3.4.5.1 designating the subsystem 134 is utilized. The iSCSI IOP 110 then requests how many disk drives are located in the subsystem 134 at the IP address 3.4.5.1. The iSCSI IOP 110 uses a kernel to snoop the subsystem 134. In this exemplary embodiment, the kernel returns data indicating that disk drives 136, 138, 140, 142, 144, 146, and 148 exist at the subsystem 134. In one embodiment, predefined zoning can be utilized so a user knows which subsystem a particular server has access to and, therefore, knows how many drives are present in the accessible subsystems. In another embodiment, zoning does not have to be utilized where a particular server has access to all of the subsystems 128, 130, and 134 on the network 102.

Before the option ROM BIOS 112 can use the information regarding the number of disks at the subsystem, an operating system installation CD (e.g., the Windows 2000 CD-ROM) in the CD-ROM drive begins operating and requests the option ROM BIOS 112 to determine how many drives are present on the subsystem 134 at the IP address 3.4.5.1. It should be appreciated that any suitable operating system may be installed such as, for example, Windows NT, Linux, etc. It should also be understood that the IP address of 3.4.5.1 is used only for exemplary purposes and that the storage device may have any suitable IP address. Continuing with the present example, Windows 2000 then receives data from the option ROM BIOS 112 indicating that the subsystem 134 has seven disk drives. The user is then prompted to select a disk drive to which the operating system will be installed. It should be understood that the operating system can be installed in any suitable disk drive located in any suitable subsystem to which the server is connected. In one example, the user selects Disk-4 144. The Windows 2000 installation program then copies all of the required programs to Disk-4 144 within the subsystem 134.

After the first phase of installation is done, the server 106 is rebooted. Windows 2000 now knows that the boot up data is located within Disk-4 144 within the subsystem 134 at IP address 3.4.5.1. The installation continues until Windows 2000 installation is finished and the Disk-4 144 contains Windows 2000 operating system. Optionally, BBS 118 can be utilized to make Disk-4 144 the primary boot up storage device. Therefore, at boot up, the server 106 will boot from Disk-4 144.

In one embodiment, an entry pointer associated with the boot up drive is at a device value of 80 h in system RAM of the server 106, so that the operation of booting can be accomplished by an INT13 call. The booting operation can then take place from the entry pointer. When the server is subsequently rebooted, system BIOS 122 initializes and goes to 80 h and requests the first sector data. The system BIOS 122 instructs the option ROM BIOS 112 to instruct a kernel to obtain boot up data at the first sector. The option ROM BIOS 112 knows the IP address, finds the Disk-4 144, and feeds the data from the first sector to the system BIOS 122. In one embodiment the data from the first sector is an operating system boot loader which is loaded into the host memory for running. It should be appreciated that the data in the first sector may be any suitable type of data that enables the boot up of the server 106. The operating system boot loader then starts running the boot process with data stored in Disk-4 144.

In one embodiment, the operating system boot loader discovers and builds a mapping of the hardware configuration of the iSCSI client upon which it is running. In another embodiment, the operating system boot loader skips the discovery process. Next, the operating system boot loader runs inputs/outputs (IOs) through the system BIOS 122 to request a remainder of the operating system image. The remainder of the operating system image is obtained sequentially through multiple system BIOS 122/option ROM BIOS 112 INT13 calls in the form of block IOs. The operating system boot loader sequentially copies the operating system image to the host memory and runs the operating system from the host memory. The operating system then performs all the system level writes and hibernates the iSCSI client host memory upon which it is running. In one embodiment, when the system is hibernated, a disk space (LUN) may be allocated on the target side through the driver or power may be sustained to the iSCSI client host memory.

If other servers are connected to the network 102, the hardware configuration can be the same for all servers. The other servers can then use the same process as used with the server 106, wherein the IP address of the target storage device is received by the servers. The servers are then booted up from the target storage device because the operating system is already installed onto the target storage device. Therefore, to configure the other servers to boot from the Disk-4 144, at power on, the control-A keystroke is utilized to bring up the setup screen and the IP address for the subsystem 134 gets stored in all the servers. Consequently, all of the servers can then access the Disk-4 144 to boot up Windows 2000.

It should be appreciated that although the methodology described herein in the exemplary embodiments utilize a block based data transmission (i.e., transmission of blocks of data that are organized in, for example, data packets) instead of a file based data transmission (i.e., transmission of whole files), the present invention is not restricted to use of the block based transmission. The present invention is flexible in that netbooting (booting over a network) can be enabled using either a file based data transmission system (e.g., PXE) or a block based data transmission system (e.g., iSCSI).

Figure 3:
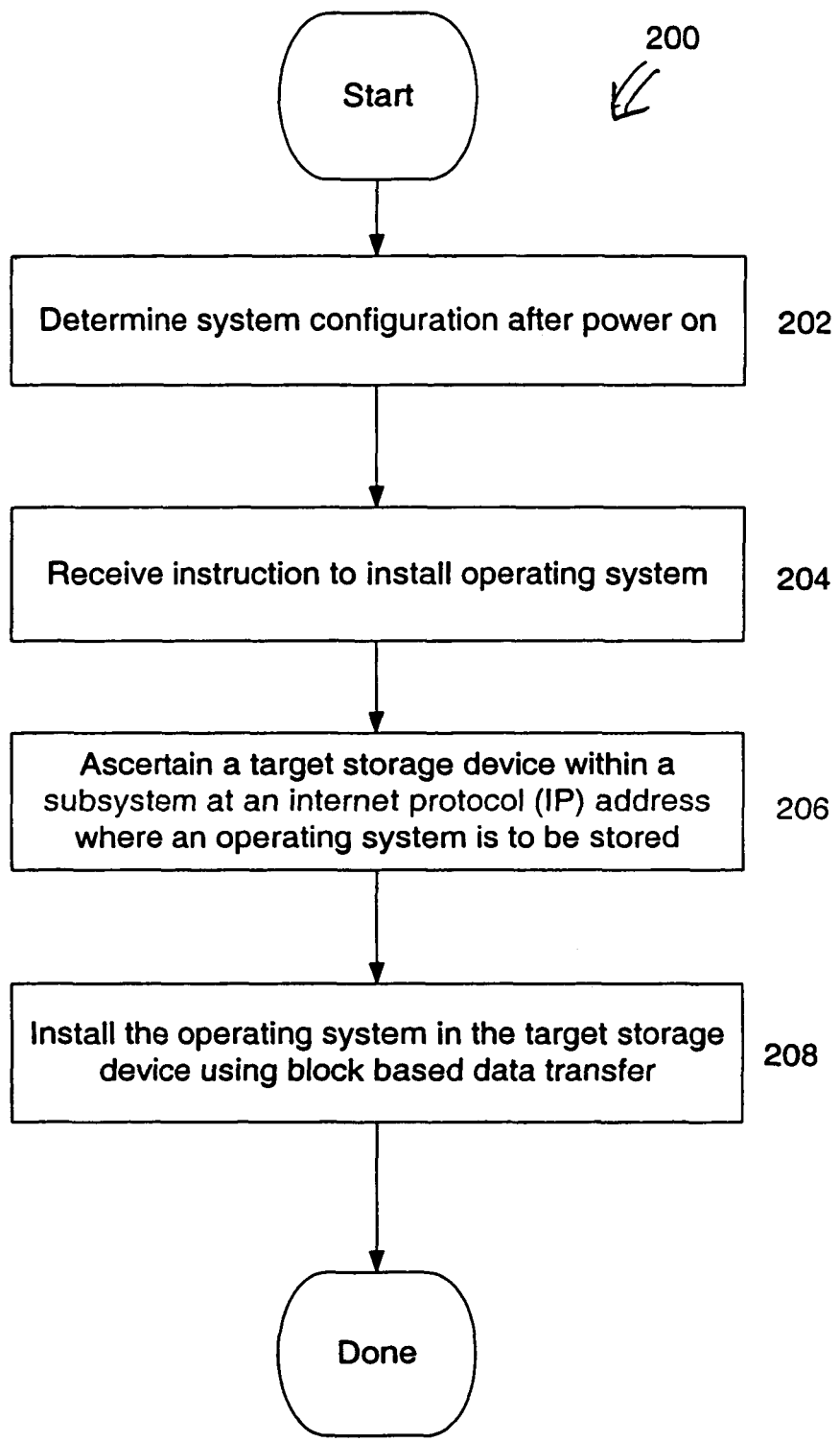
FIG. 3 shows a flowchart which defines an operating system installation, in accordance with one embodiment of the present invention.

FIG. 3 shows a flowchart 200 which defines an operating system installation, in accordance with one embodiment of the present invention. It should be understood that the processes depicted in the flowchart 200 may be in a program instruction form written on any type of computer readable media. For instance, the program instructions can be in the form of software code developed using any suitable type of programming language. For completeness, the process flow of FIG. 3 illustrates an exemplary process whereby an operating system is stored on a boot device connected to a network so that a server can boot from the boot device using an iSCSI protocol.

The method begins with an operation 202 for determining a system configuration after power on. The operation 202 examines a network system and finds storage devices connected to the network system. The operation 202 is described in further detail in reference to FIG. 4.

After the operation 202, the method moves to an operation 204 for receiving an instruction to install an operating system. As indicated below, user input is detected to start system setup and to receive IP address information. In one embodiment, Windows 2000 is the operating system to be installed. It should be appreciated, however, that any suitable operating system can be installed such as, for example, Windows NT, Linux, etc. The operation 204 is described in further detail in reference to FIG. 5.

The method continues with an operation 206 for ascertaining a target storage device within a subsystem at an internet protocol (IP) address where an operating system is to be stored. In this operation, the server receives input from a user regarding which target storage device within a particular subsystem will be used to store the operating system. In one embodiment (as described in reference to FIG. 2), after the system BIOS is activated and before the kernel returns with the configuration data, an operating system setup program is run from a storage media such as, for example, a CD-ROM. The operating system setup program then requests that the option ROM BIOS being run in the iSCSI IOP use a kernel to determine how many disks exist at the IP address input by the user. The kernel snoops the particular subsystem at the IP address and determines how many and what types of storage devices exist in the particular subsystem. In one embodiment, information regarding the number and types of storage devices in the particular subsystem is transmitted to the system BIOS which displays the information for the user to view. The user can then provide input to select the particular storage device onto which the operating system will be installed (i.e., the target storage device).

In one embodiment, the target storage device corresponds to a disk drive. It should be appreciated, however, that any suitable type or number of storage devices may be connected to the network and utilized by the server for boot up purposes. It should be further appreciated that any suitable type of networking standard can be utilized to facilitate communication between devices on the network. For example, in one embodiment, iSCSI is utilized as an internet protocol based storage networking standard.

After operation 206, the method proceeds with an operation 208 for installing the operating system on the target storage device using block based data transfer. The operation 208 utilizes an installation program for the operating system and installs the files of the operating system onto the target storage device such as, for example, a disk drive located in the subsystem specified by the user. The operation 208 is described further in reference to FIG. 6.

Figure 4:
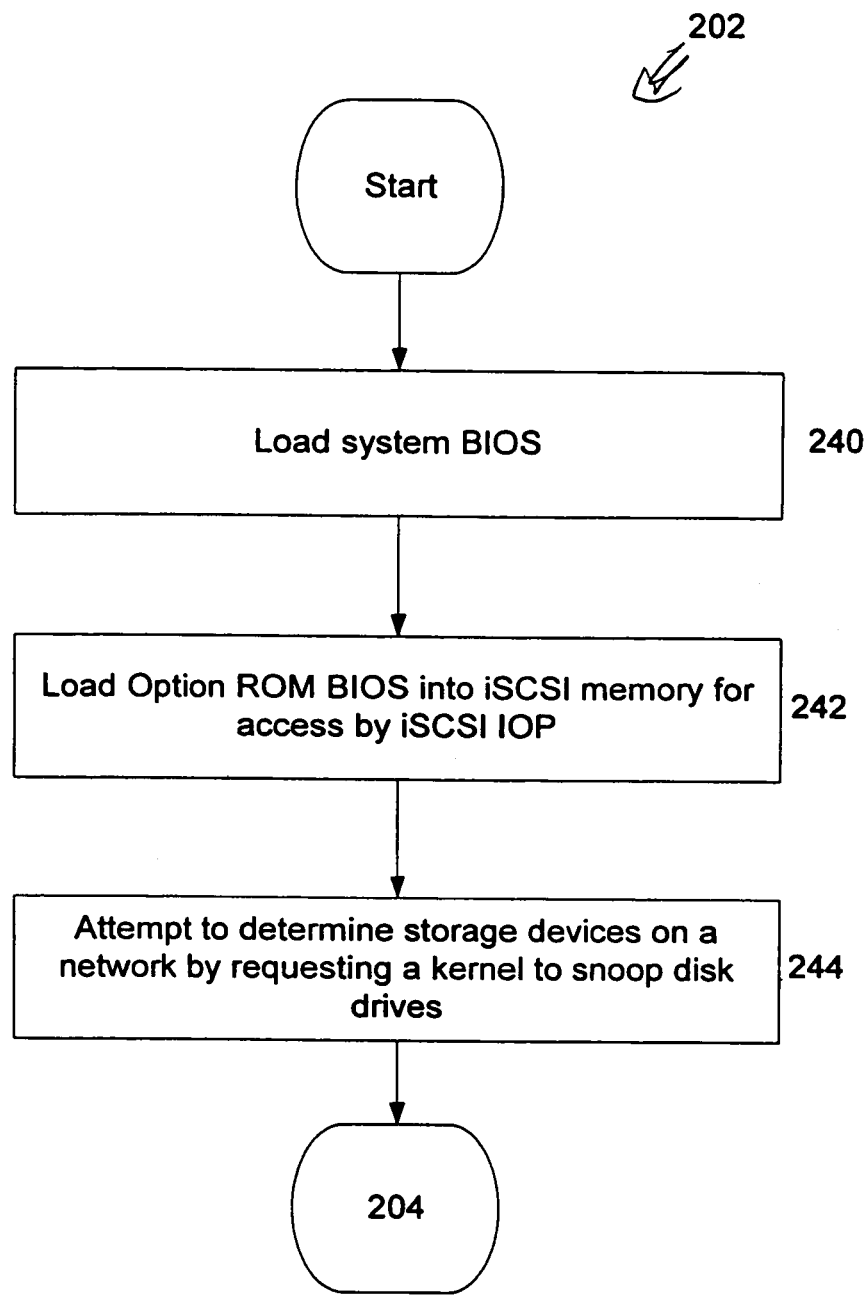
FIG. 4 shows a flowchart corresponding to the operation for determining the system configuration after power on, in accordance with one embodiment of the present invention.

FIG. 4 shows a flowchart corresponding to the operation 202 for determining the system configuration after power on, in accordance with one embodiment of the present invention. The operation 202 begins with an operation 240 in which a system BIOS is loaded. In the operation 240, the system BIOS communicates with the iSCSI card to initiate the loading of the option ROM BIOS.

After the operation 240, the operation 202 continues with an operation 242 in which an option ROM BIOS is loaded into iSCSI card memory for access by iSCSI IOP. The option ROM BIOS represents code that is stored in non-volatile memory. It should be appreciated that the non-volatile memory can be any suitable type of device capable of storing data in a power off state. In one embodiment, the non-volatile memory is an EEPROM. The iSCSI IOP represents a microprocessor that uses iSCSI code to manage the input and output of data.

The operation 202 further includes an operation 244 in which an attempt is made to determine storage devices on a network by requesting a kernel to snoop disk drives. The kernel represents code that is typically stored in non-volatile memory. The kernel can be retrieved into the iSCSI memory for use by the iSCSI IOP. The kernel can be generated to examine devices that are connected to the network to determine what devices are accessible through the network. Unless an IP address is specified, the kernel will return with many disk drives located on the subsystems connected to the network. Therefore, this data is not typically useful in an installation process. Later, as described below in reference to FIG. 5, when an IP address of a subsystem is specified by a user, the kernel at that time can snoop the particular subsystem corresponding to the IP address to show the storage devices in that one subsystem. In one embodiment, before the kernel can report network configuration back to the iSCSI IOP, which in turn may notify the system BIOS, the operation 204 of FIG. 3 begins.

Figure 5:
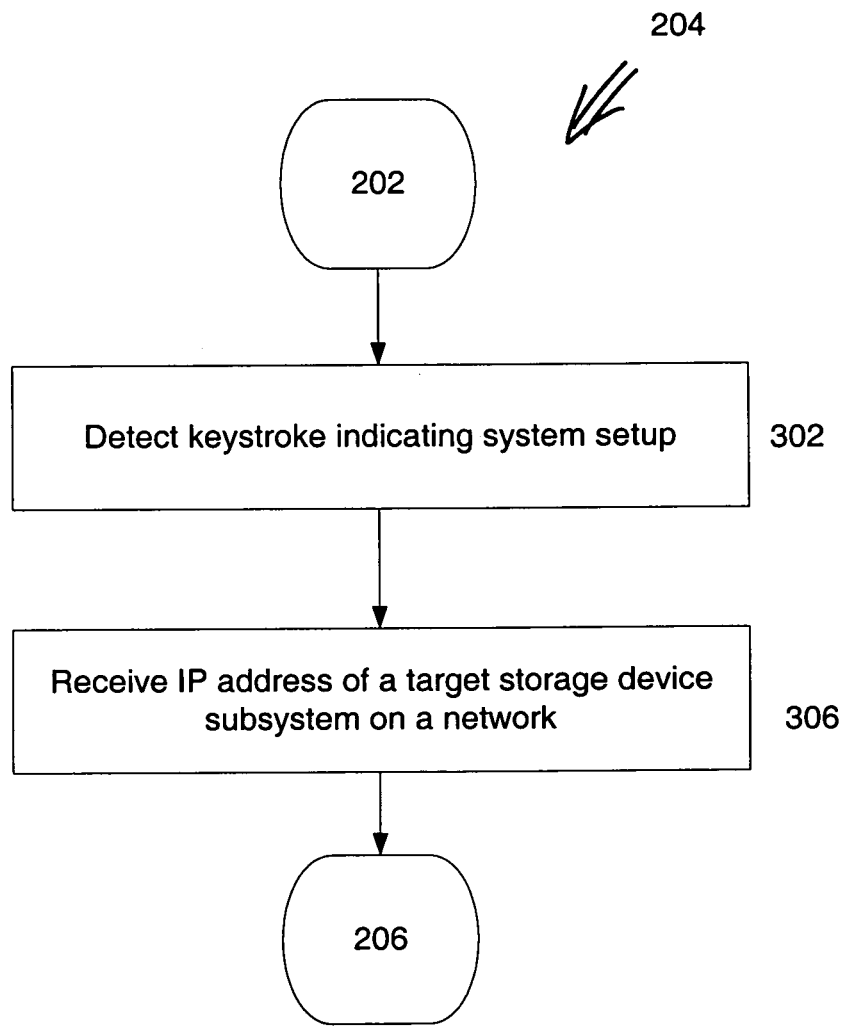
FIG. 5 shows a flowchart corresponding to the operation for receiving the instruction to install the operating system, in accordance with one embodiment of the present invention.

FIG. 5 shows a flowchart corresponding to the operation 204 for receiving the instruction to install the operating system, in accordance with one embodiment of the present invention. The operation 204 includes an operation 302 for detecting a keystroke that indicates system setup. It should be appreciated, that any suitable type of keystroke utilizing any suitable number of keys can be utilized to indicate that the system setup is to be initiated. In one embodiment, control-A may be utilized as the keystroke. It should be appreciated, that the keystroke can be performed in any suitable timeframe. In one embodiment, the keystroke can be performed after the BIOS has started running and before receiving the response from the kernel regarding the network configuration.

The operation 204 further includes an operation 306 for receiving an IP address of a target storage device subsystem on a network. In operation 306, a user may input the IP address of the target storage device subsystem where the operating system is to be stored. By inputting the IP address of the subsystem, the system BIOS knows where on the network the subsystem with the boot drive is located. After this occurs, the system BIOS can then instruct the iSCSI IOP to determine how many disk drives are on the subsystem where the operating system is to be stored.

Figure 6:
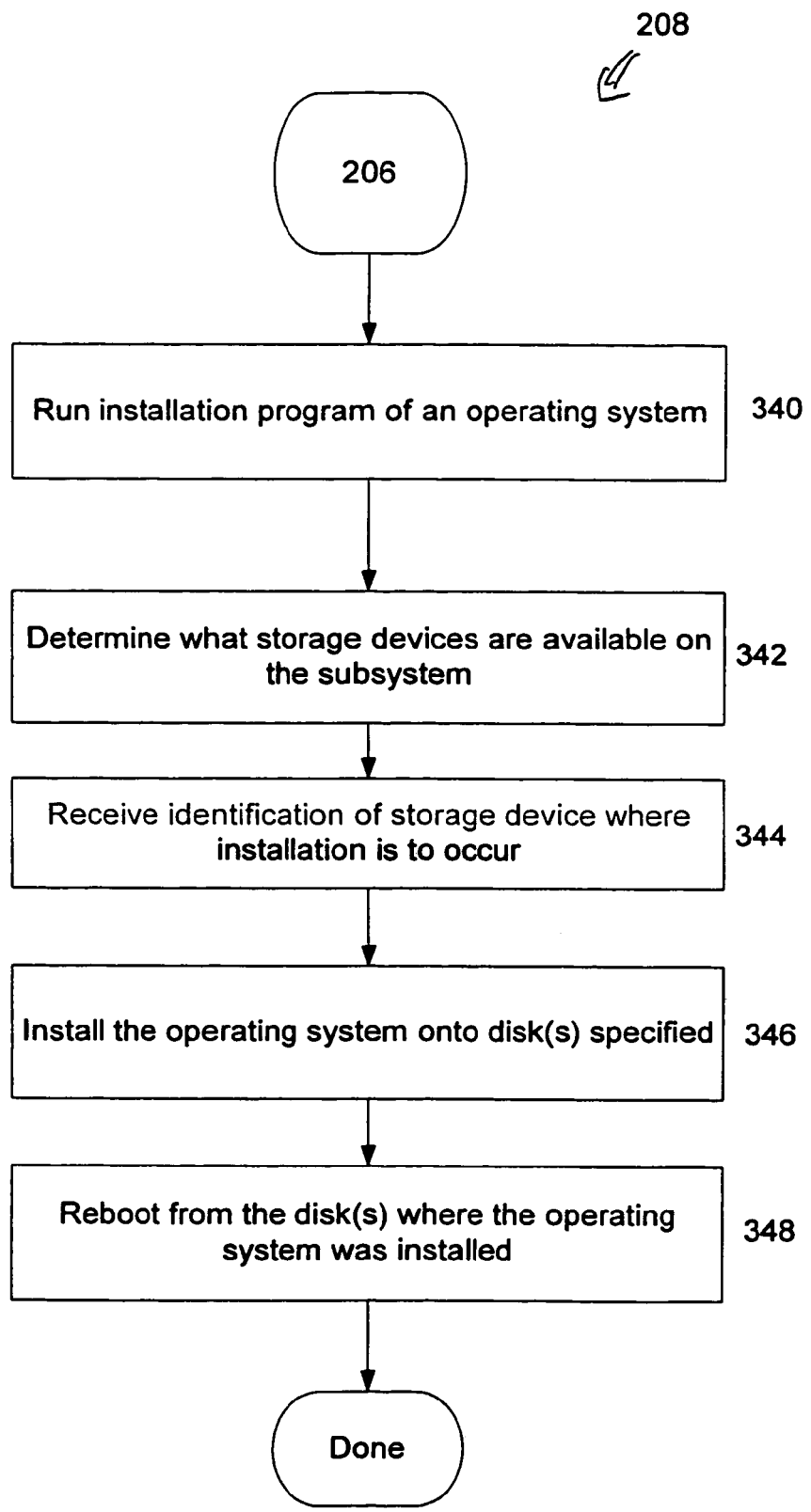
FIG. 6 shows a flowchart corresponding to the operation for installing the operating system on the target storage device using block based data transfer, in accordance with one embodiment of the present invention.

FIG. 6 shows a flowchart corresponding to the operation 208 for installing the operating system on the target storage device using block based data transfer, in accordance with one embodiment of the present invention. The operation 208 includes an operation 340 for running an installation program of an operating system. In one embodiment, before the system BIOS determines how many disk drives are on the subsystem as discussed above in reference to operation 206, the installation program for the operating system located in the CD-ROM may begin to operate.

The operation 208 further includes an operation 342 for determining what storage devices are available on the subsystem. In one embodiment, after the installation program has started to run, it requests that the option ROM find out how many disks are located on the subsystem corresponding to the input IP address.

An operation 344 is also provided for receiving the identification of the target storage device where installation is to occur. In the operation 344, the installation program receives data indicating how many disk drives are located in the subsystem where the operating system is to be installed. The available disk drives are shown on the screen to allow the user to specify which specific disk drive will contain the operating system.

An operation 346 is then provided for installing the operating system onto the specified target storage device. In one embodiment, after determining which disk drive will contain the operating system, the installation program copies the operating system files to the disk drive selected.

After the operation 346 is completed, the operation 208 includes an operation 348 for rebooting from the target storage device where the operating system was installed. In operation 348, the server reboots so the installation program can complete the installation of the operating system. After the installation is complete, the server will use the target storage device containing the operating system to boot up at power on. Therefore, the server can utilize a data block transport protocol and retrieve operating system data from a storage device over the network for booting up without the use of directly attached storage devices.

Figure 7:
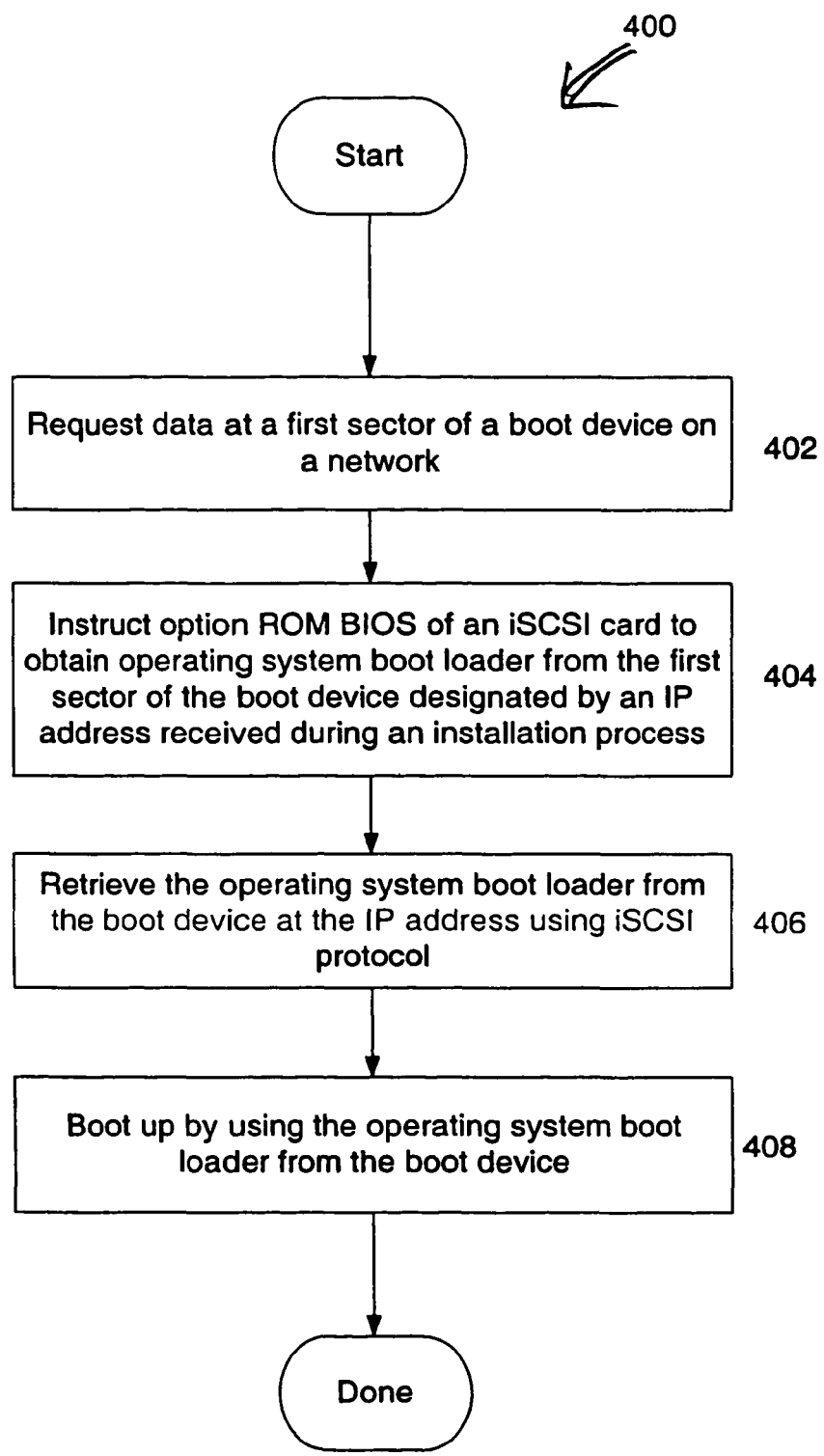
FIG. 7 is an illustration showing a flowchart of a boot up process, in accordance with one embodiment of the present invention.

FIG. 7 is an illustration showing a flowchart of a boot up process 400, in accordance with one embodiment of the present invention. The boot up process 400 begins with an operation 402 in which data is requested at a first sector of a boot device on a network. In one embodiment, at power up, the system BIOS begins the boot up process and, therefore, needs the first sector data of the boot drive. The boot drive (also known as a target storage device) is a storage device which has had an operating system installed on it through an installation process as described above with respect to FIGS. 3 through 6.

After the operation 402, the boot up process 400 proceeds with an operation 404 for instructing an option ROM BIOS of an iSCSI card to obtain an operating system boot loader from the first sector of the boot device designated by an IP address received during an installation process. In the operation 404, the system BIOS directs the option ROM BIOS located on a iSCSI card to find and obtain data located in the first sector of the boot drive located on a subsystem connected to the network.

The boot up process 400 then continues with an operation 406 for using an iSCSI protocol to retrieve the operating system boot loader from the boot device at the IP address. Therefore, in one embodiment, boot up from a boot device occurs over a network using a transmission protocol that transfers data blocks instead of data files. In the operation 406, the option ROM BIOS running in an iSCSI IOP uses iSCSI commands and associated methods, in conjunction with the IP address, to send commands to the boot device for retrieving the operating system boot loader. The boot process continues by retrieving operating system data in a like manner.

After the operation 406, the boot up process 400 proceeds with an operation 408 in which the operating system boot loader obtained from the boot device is used to boot up the system. The operating system boot loader proceeds to boot up the system using procedures appropriate to the particular operating system (e.g., Windows 2000, Windows NT, Linux, etc. ... ).

Using the methodology as described in FIGS. 3 through 7, after a first server has been set up for boot up from the target storage device where the operating system has been stored, the remaining servers may be configured to boot up and load the operating system from the target storage device over the network without having to locally store additional operating systems. Exemplary embodiments using the methods of FIGS. 3 through 7 with an iSCSI system are discussed below. It should be appreciated that the embodiments described below are exemplary and represent specific examples of how the method described herein may be utilized.

In one exemplary embodiment of an installation process, an end user does not need to indicate that installation is for an iSCSI target or use a special package for iSCSI target mode installation. The installation setup initially uses BIOS INT13 calls, after which the installation setup proceeds by using the driver to the boot PCI device to continue installation.

In a boot up process, the iSCSI client discovers an iSCSI target (such as a target storage device) based on a pre-configured IP address gathered during installation. Then, the BIOS initializes and requests a first sector from the target storage device and jumps to the loaded sector (operating system loader) in the host memory and runs the operating system loader. The operating system loader runs IOs through the BIOS to request the rest of the operating system image sequentially through multiple BIOS/option ROM BIOS INT13 calls, in the form of block IOs. The operating system loader sequentially loads the needed sectors and runs the operating system from the dedicated target ID (TID)/logical unit (LUN). The TID/LUN may serve to identify the target device. During installation, the operating system is aware of an additional LUN per client where system level writes and reads can happen. In case of hibernation, a disk space may be allocated on the target side through the driver.

In another exemplary embodiment using iSCSI protocol, during the installation phase, an end user does not need to indicate that installation is for an iSCSI target or use a special package for iSCSI target mode installation. In this embodiment, a user indicates the dedicated LUN per client for system level writes/reads. The installation setup then utilizes BIOS/option ROM BIOS INT13 calls after which the installation setup proceeds by using the driver to the boot PCI device to continue installation.

The present invention may implemented using an appropriate type of software driven computer-implemented operation. As such, various computer-implemented operations involving data stored in computer systems to drive computer peripheral devices (i.e., in the form of software drivers) may be employed. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as ascertaining, identifying, scanning, or comparing.

Any of the operations described herein that form part of the invention are useful machine operations. Any appropriate device or apparatus may be utilized to perform these operations. The apparatus may be specially constructed for the required purposes, or it may be a general purpose computer selectively activated or configured by a computer program stored in the computer. In particular, various general purpose machines may be used with computer programs written in accordance with the teachings herein, where it may be more convenient to construct a more specialized apparatus to perform the required operations.

Although the foregoing invention has been described in some detail for purposes of clarity of understanding, it will be apparent that certain changes and modifications may be practiced within the scope of the appended claims. Accordingly, the present invention is to be considered as illustrative and not restrictive, and the invention is not to be limited to the details given herein, but may be modified within the scope and equivalence of the appended claims.

What is claimed is:

1. A method for booting up a server using a target storage device over a network, comprising:
    installing an operating system of the server by storing the operating system of the server in the target storage device located within the network, wherein the location of the target storage device is designated by an internet protocol (IP) address of the target storage device;
    accessing the operating system of the server on the target storage device using the IP address of the target storage device, the accessing being performed from the server using data block transfers;
    operating a system BIOS of the server to instruct an option ROM BIOS of an iSCSI card of the server to obtain an operating system boot loader from a first sector of the target storage device designated by the IP address;
    operating the option ROM BIOS of the iSCSI card to issue BIOS calls to obtain data defining the operating system boot loader from the first sector of the target storage device using an iSCSI protocol that transfers data blocks;
    executing the operating system boot loader to run inputs/outputs through the system BIOS of the server to request a remainder of an operating system image;
    obtaining the remainder of the operating system image sequentially through multiple calls of the system BIOS of the server and the option ROM BIOS of the iSCSI card in the form of block inputs/outputs; and
    executing the operating system boot loader to sequentially copy the operating system image to a host memory and run the operating system from the host memory.

2. A method for booting up a server as recited in claim 1, wherein the installing includes,
    determining a network system configuration after power on,
    receiving an instruction to install the operating system of the server,
    receiving the IP address where the target storage device is located,
    finding the target storage device at the IP address, and
    copying the operating system of the server into the target storage device over the network using block data transfer.

3. A method for booting up a server as recited in claim 1, further comprising:
    installing the operating system of the server on an additional server by notifying the additional server of the IP address of the target storage device where the operating system of the server is located.

4. A method for booting up a server as recited in claim 1, wherein the operating system of the server utilizes a graphical user interface.

5. A method for booting up a server as recited in claim 1, wherein the target storage device is a one of a disk drive, a CD-R, and a CD-RW.

6. A method for booting up a server as recited in claim 1, wherein the server communicates with the target storage device using iSCSI protocol.

7. A method for booting up a server as recited in claim 1, further comprising:
    booting up the server using the operating system boot loader.

8. A method for booting up a server over a network using a remote storage device, comprising:
    operating a system BIOS of the server to instruct an option ROM BIOS of an iSCSI card of the server to issue BIOS calls to retrieve an operating system boot loader from a first sector of the remote storage device using an iSCSI protocol that transfers data blocks, a location of the remote storage device being designated by an internet protocol (IP) address stored during an operating system installation process;
    executing the operating system boot loader to run inputs/outputs through the system BIOS of the server to request a remainder of an operating system image;
    obtaining the remainder of the operating system image sequentially through multiple calls of the system BIOS of the server and the option ROM BIOS of the iSCSI card in the form of block inputs/outputs; and
    executing the operating system boot loader to sequentially copy the operating system image to a host memory and run the operating system from the host memory.

9. A method for booting up a server as recited in claim 8, further comprising:
    transferring data associated with the operating system from the remote storage device to the server using an iSCSI protocol.

10. A method for booting up a server as recited in claim 8, wherein retrieving the operating system boot loader includes,
    instructing the option ROM BIOS to direct a kernel to obtain the operating system boot loader at the first sector,
    copying the operating system boot loader into a memory on the server, and
    running the operating system boot loader to boot up the server.

11. A method for booting up a server as recited in claim 8, wherein booting up the server includes copying operating system data from the remote storage device to a memory on the server.

\* \* \* \* \*